US012564920B2

(12) United States Patent
Osawa et al.

(10) Patent No.: US 12,564,920 B2
(45) Date of Patent: Mar. 3, 2026

(54) FASTENING TOOL

(71) Applicant: MAX CO., LTD., Tokyo (JP)

(72) Inventors: Yusuke Osawa, Tokyo (JP); Kazuya Takeuchi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 254 days.

(21) Appl. No.: 18/133,944

(22) Filed: Apr. 12, 2023

(65) Prior Publication Data

US 2023/0330820 A1 Oct. 19, 2023

(30) Foreign Application Priority Data

Apr. 15, 2022 (JP) ................................ 2022-067611

(51) Int. Cl.

*B25B 21/00* (2006.01)
*B25B 23/00* (2006.01)
*B25B 23/06* (2006.01)

(52) U.S. Cl.

CPC ........ *B25B 21/002* (2013.01); *B25B 23/0035* (2013.01); *B25B 23/06* (2013.01)

(58) Field of Classification Search

CPC ............................ B25B 21/002; B25B 21/008
See application file for complete search history.

(56) References Cited

U.S. PATENT DOCUMENTS 5,469,924 A 11/1995 Kanamori et al.
5,549,169 A 8/1996 Matsumura et al.
5,890,405 A * 4/1999 Becker .................. B25B 23/147 81/434
7,802,500 B2 * 9/2010 Kolodziej ................. B25C 1/04 81/57.44
2013/0255447 A1 * 10/2013 Po ......................... B25B 23/045 81/57.11
2015/0273671 A1 10/2015 Totsu
2020/0001442 A1 1/2020 Totsu
2021/0394343 A1 12/2021 Totsu

FOREIGN PATENT DOCUMENTS

CN 104661796 A 5/2015
JP H06-262453 A 9/1994
JP H07-009283 A 1/1995
JP 5262461 B2 8/2013
JP 2015066661 A 4/2015
JP 6197547 B2 9/2017
WO 2014-065066 A1 5/2014

* cited by examiner

*Primary Examiner* — Nathaniel C Chukwurah
(74) *Attorney, Agent, or Firm* — Banner & Witcoff, Ltd.

(57) ABSTRACT

A fastening tool includes a bit holding portion configured to detachably hold a driver bit and rotatable in a circumferential direction and movable in an axial direction, a first motor configured to rotate the bit holding portion, a position detector configured to detect a position of the bit holding portion along the axial direction, and a controller configured to drive the first motor to rotate the bit holding portion. The controller is configured to determine, based on the position of the bit holding portion, whether the bit holding portion moves to a forward movement end position and to stop the rotation of the first motor in a case where the bit holding portion does not reach the forward movement end position and a stop condition of the first motor is satisfied.

13 Claims, 10 Drawing Sheets

FASTENING TOOL

CROSS-REFERENCE TO RELATED APPLICATIONS

This application is based upon and claims the benefit of priority from prior Japanese patent application No. 2022-067611, filed on Apr. 15, 2022, the entire contents of which are incorporated herein by reference.

TECHNICAL FIELD

The present disclosure relates to a fastening tool in which a driver bit is engaged with a screw, the screw is pressed against a fastening target by the driver bit, and the driver bit is rotated to be screwed.

BACKGROUND ART

There is known a tool referred to as a portable driving machine that uses an air pressure of compressed air supplied from an air compressor or a combustion pressure of gas to sequentially punch a coupling stopper loaded in a magazine from a tip of a driver guide.

In a tool in which a bit is rotated to fasten a screw and is moved in a direction in which the screw is driven, in the related art, a pneumatic screw driving machine in which a bit is rotated by an air motor and moved by an air pressure in a direction in which the screw is driven is proposed (for example, refer to Patent Literature 1).

Further, a screw driving machine that compresses a spring by a driving force of a motor for rotating a driver bit and drives a screw by moving the driver bit in an axial direction by biasing of the spring is proposed (for example, refer to Patent Literature 2).

CITATION LIST

Patent Literature

Patent Literature 1: JP5262461B

Patent Literature 2: JP6197547B

In the screw driving machine in which the driver bit is moved in an axial direction by a biasing of the spring to drive the screw, completion of a screw fastening operation is determined by detecting downward movement of the driver bit by a sensor that detects the driver bit. However, when a situation occurs in which the sensor is broken or the screw is tilted in a nose and the driver bit does not advance, since the completion of the operation of fastening the screw cannot be detected, the operation of fastening the screw may continue.

The present disclosure is made to solve such a problem and is to provide a fastening tool capable of ending the operation of fastening the screw even when completion of a normal operation of fastening the screw cannot be detected.

SUMMARY OF INVENTION

According to an aspect of the invention, a fastening tool includes a bit holding portion configured to detachably hold a driver bit and rotatable in a circumferential direction of the driver bit held in the bit holding portion and movable in an axial direction of the driver bit held in the bit holding portion, a first motor configured to rotate the bit holding portion, a position detector configured to detect a position of the bit holding portion along the axial direction of the driver bit, and a controller configured to drive the first motor to rotate the bit holding portion. The controller is configured to determine, based on the position of the bit holding portion detected by the position detector, whether the bit holding portion moves to a forward movement end position and to stop the rotation of the first motor in a case where the bit holding portion does not reach the forward movement end position and a stop condition of the first motor is satisfied.

In the above aspect, a rotation of the firsts motor is stopped in a case where it is determined that the bit holding portion moves to the forward movement end position. A rotation of the first motor is stopped when a stop condition is satisfied in a case where the bit holding portion moved to the forward movement end position is not detected and it is determined that the bit holding portion does not move to the forward movement end position.

According to another aspect of the invention, a fastening tool includes a bit holding portion configured to detachably hold a driver bit and rotatable in a circumferential direction of the driver bit held in the bit holding portion movable in an axial direction of the driver bit held in the bit holding portion, a first motor configured to rotate the bit holding portion, a contact member configured to come into contact with a fastening target to which a screw engaged with the driver bit is fastened, a contact switch portion capable of moving between an ON state and an OFF state by movement of the contact member in the axial direction and a position detector configured to detect a position of the bit holding portion along the axial direction, and a controller configured to drive the first motor to rotate the bit holding portion. The controller is configured to control a timing at which driving of the first motor is stopped based on whether the contact switch is in the ON state or the OFF state, determine whether the contact switch portion is in the ON state or the OFF state when the controller determines that the bit holding portion moves to a forward movement end position based on the position of the bit holding portion detected by the position detector, and continue the rotation of the first motor until a stop condition is satisfied in a case where the contact switch portion is in the OFF state.

In the above aspect, a rotation of the firsts motor is stopped in a case where it is determined that the bit holding portion moves to the forward movement end position. A state where the contact switch is in the OFF state may be assumed as a floating state of the fastening tool and a rotation of the first motor in a given direction is continued. After that, when the contact switch is moved to the ON state, the rotation of the first motor is stopped. In a case where the contact switch is continuously in the OFF state, the rotation of the first motor is stopped when a given stop condition is satisfied.

In the present disclosure, the rotation of the first motor may be stopped even in a state where the movement the bit holding portion to the forward movement end position cannot be detected.

In addition, in the present disclosure, the rotation of the first motor may be stopped even in a state where the timing cannot be detected at which the driving of the first motor is stopped based on whether the contact switch portion operates after the bit holding portion moves to the forward movement end position.

DESCRIPTION OF EMBODIMENTS

Hereinafter, embodiments of a fastening tool of the present disclosure will be described with reference to each drawing.

Configuration Example of Fastening Tool of the Present Embodiment

Figure 1A:
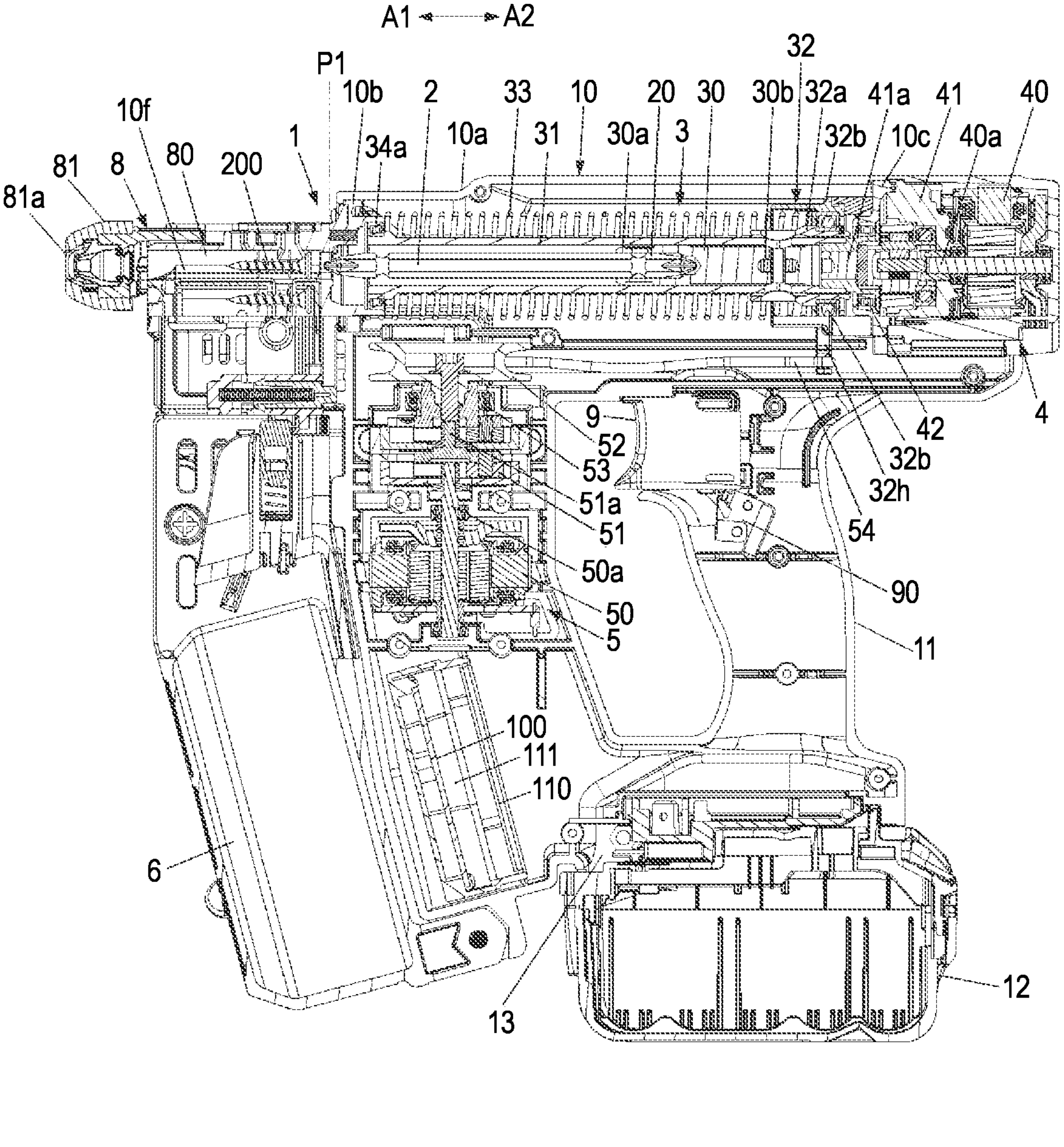
FIG. 1A is a cross-sectional view showing an example of an internal structure of a fastening tool of the present embodiment.
Figure 1B:
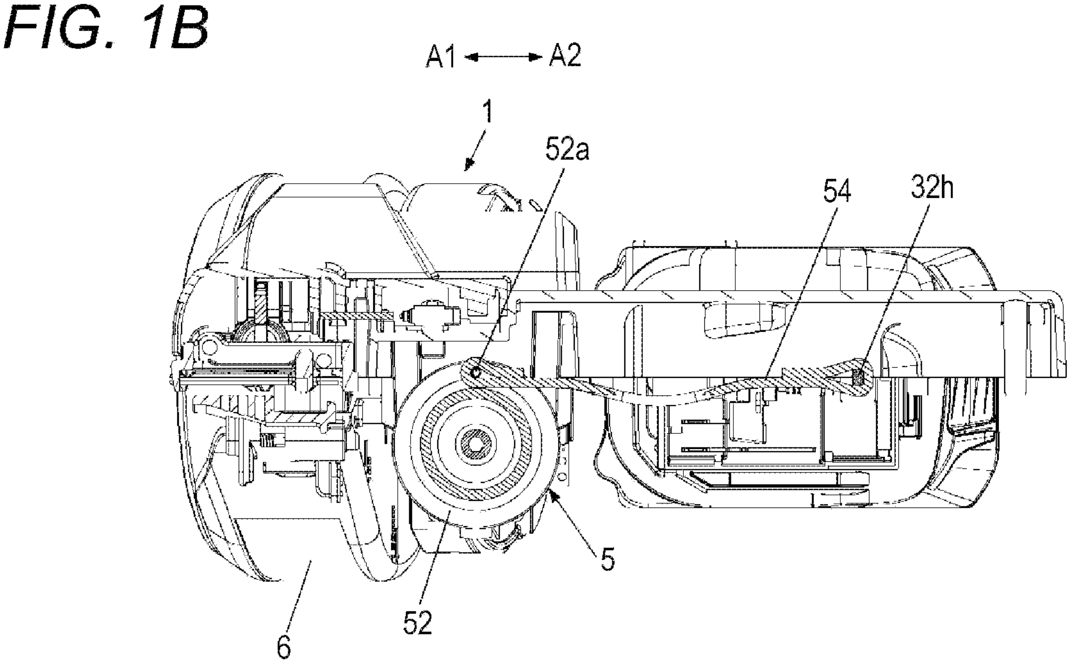
FIG. 1B is a sectional plan view showing an example of the internal structure of the fastening tool of the present embodiment.
Figure 1C:
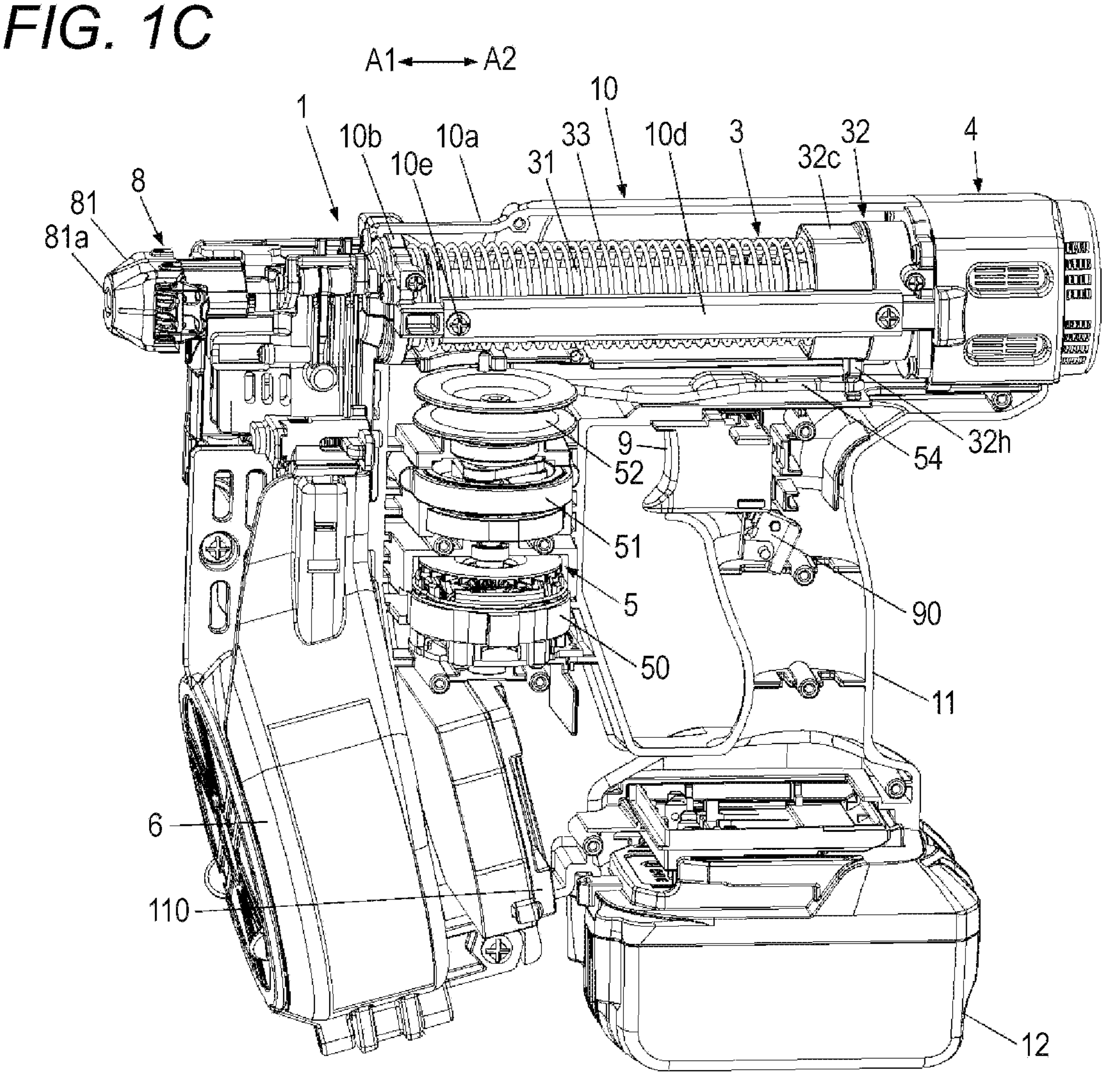
FIG. 1C is an exploded perspective view showing an example of the internal structure of the fastening tool of the present embodiment.

FIG. 1A is a cross-sectional view showing an example of an internal structure of a fastening tool of the present embodiment, FIG. 1B is a sectional plan view showing an example of the internal structure of the fastening tool of the present embodiment, and FIG. 1C is an exploded perspective view showing an example of the internal structure of the fastening tool of the present embodiment.

A fastening tool 1 of the present embodiment includes a bit holding portion 3 that rotatably and movably holds a driver bit 2 in an axial direction, a first driving portion 4 that rotates the driver bit 2 held by the bit holding portion 3, and a second driving portion 5 that moves the driver bit 2 held by the bit holding portion 3 in the axial direction.

In addition, the fastening tool 1 includes a screw storage portion 6 in which a screw 200 is stored, a screw feed portion 7 described later that feeds the screw stored in the screw storage portion 6, and a nose portion 8 that is pressed against a fastening target into which the screw 200 is fastened and from which the screw 200 is injected.

Further, the fastening tool 1 includes a tool body 10 and a handle 11. The fastening tool 1 also includes a battery attachment portion 13 to which a battery 12 is detachably attached to an end portion of the handle 11.

In the fastening tool 1, the tool body 10 extends in one direction along an axial direction of the driver bit 2 indicated by arrows A1 and A2, and the handle 11 extends in another direction intersecting the extending direction of the tool body 10. In the fastening tool 1, the direction in which the tool body 10 extends, that is, the axial direction of the driver bit 2 indicated by the arrows A1 and A2 is defined as a front-rear direction. In addition, in the fastening tool 1, the direction in which the handle 11 extends is defined as an up-down direction. Further, in the fastening tool 1, a direction orthogonal to the extending direction of the tool body 10 and the extending direction of the handle 11 is defined as a left-right direction.

The first driving portion 4 is provided on a rear side, which is one side of the tool body 10, with the handle 11 interposed therebetween. The second driving portion 5 is provided on a front side, which is the other side of the tool body 10, with the handle 11 interposed therebetween.

In the screw storage portion 6, a plurality of screws 200 are connected by a connecting band, and a connection screw wound in a spiral shape is stored.

Figure 2A:
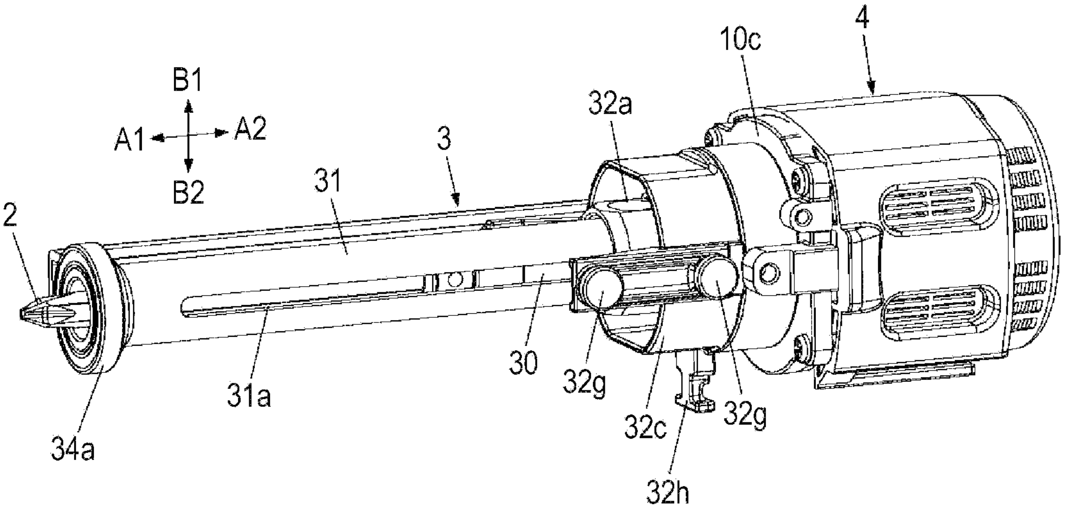
FIG. 2A is a perspective view showing an example of a main configuration of the fastening tool of the present embodiment.
Figure 2B:
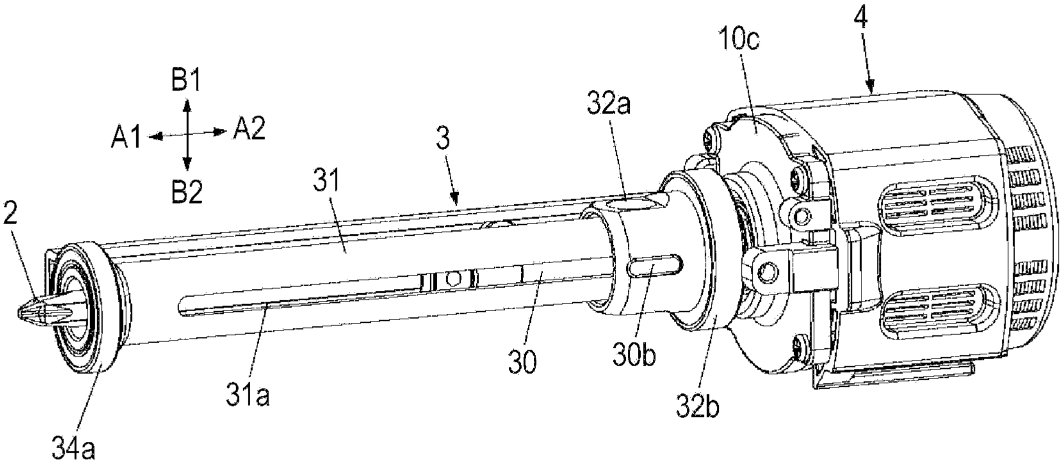
FIG. 2B is a perspective view showing an example of the main configuration of the fastening tool of the present embodiment.
Figure 3A:
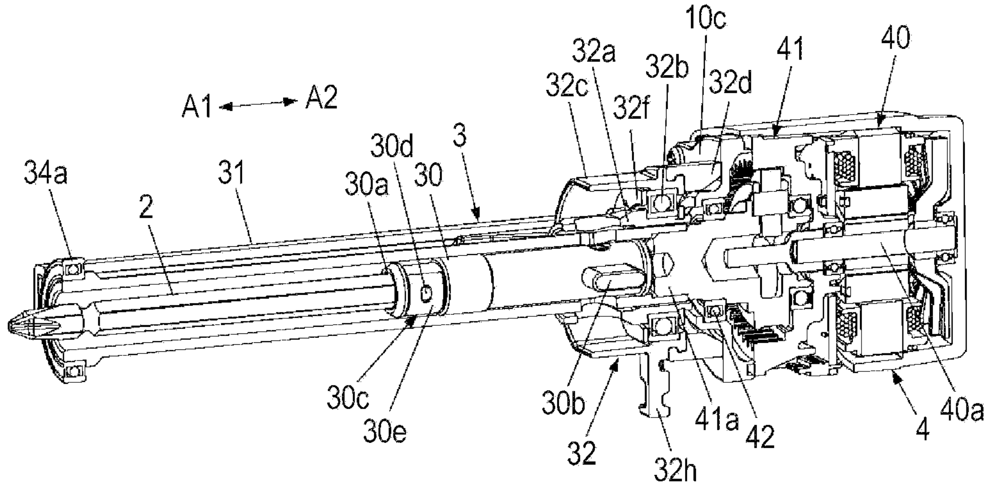
FIG. 3A is a cross-sectional perspective view showing an example of the main configuration of the fastening tool of the present embodiment.
Figure 3B:
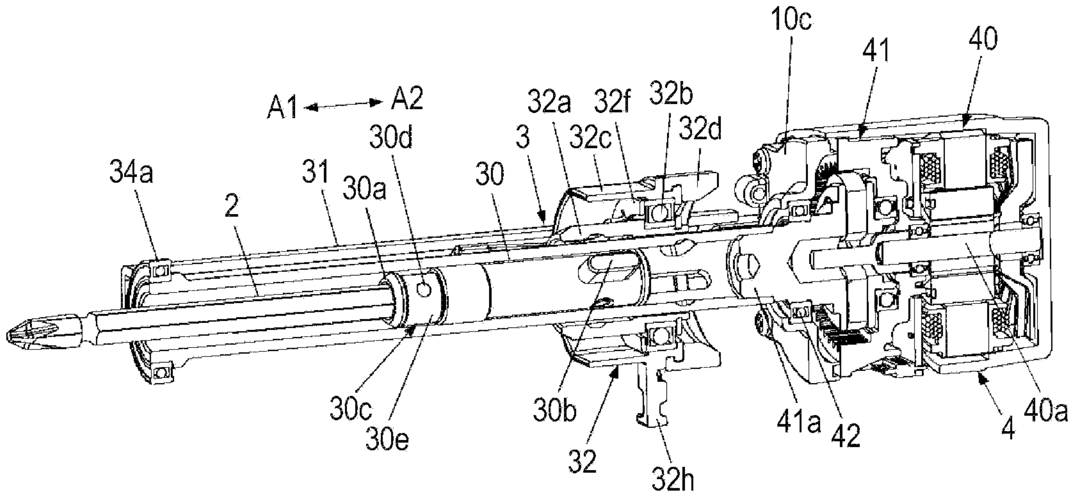
FIG. 3B is a cross-sectional perspective view showing an example of the main configuration of the fastening tool of the present embodiment.

FIGS. 2A and 2B are perspective views showing examples of a main configuration of the fastening tool of the present embodiment, and FIGS. 3A and 3B are cross-sectional perspective views showing examples of the main configuration of the fastening tool of the present embodiment. Next, the bit holding portion 3 and the first driving portion 4 will be described with reference to each drawing.

The bit holding portion 3 includes a holding member 30 that detachably holds the driver bit 2, a rotation guide member 31 that supports the holding member 30 movably in the front-rear direction indicated by the arrows A1 and A2 along the axial direction of the driver bit 2 and rotates together with the holding member 30, a moving member 32 that moves the holding member 30 in the front-rear direction along the rotation guide member 31, and a biasing member 33 that biases the moving member 32 in the rear direction indicated by the arrow A2.

The holding member 30 is formed of, for example, a cylindrical member having an outer diameter slightly smaller than an inner diameter of the rotation guide member 31 and inserted into the rotation guide member 31. In the holding member 30, an opening 30*a* having a shape matching a cross-sectional shape of the driver bit 2 is provided on a front-end portion along the axial direction of the driver bit 2. The holding member 30 includes a detachable holding mechanism 30*c* that detachably holds the driver bit 2 in the opening 30*a*. In the holding member 30, the opening 30*a* is exposed to the inside of the rotation guide member 31, and the driver bit 2 is detachably inserted into the opening 30*a*.

The detachable holding mechanism 30*c* includes a ball 30*d* exposed in the opening 30*a* and a spring 30*e* that biases the ball 30*d* in a direction in which the ball 30*d* is exposed in the opening 30*a*. The spring 30*e* is an annular leaf spring and is fitted to an outer periphery of the holding member 30.

In the detachable holding mechanism 30*c*, the ball 30*d* biased by the spring 30*e* is fitted into a groove portion of the driver bit 2 so that the driver bit 2 is prevented from being carelessly removed from the holding member 30. In addition, when a force equal to or greater than a predetermined force is applied in a direction in which the driver bit 2 is pulled out from the holding member 30, the driver bit 2 may be pulled out from the holding member 30 by retracting the ball 30*d* while deforming the annular spring 30*e*.

The rotation guide member 31 extends along the extending direction of the tool body 10, that is, the front-rear direction indicated by the arrows A1 and A2 along the axial direction of the driver bit 2. The rotation guide member 31 has a cylindrical shape in which the holding member 30 is accommodated, and a front-end portion is rotatably supported by a front frame 10*b* provided on a front side of a case 10*a* constituting an exterior of the tool body 10 via a bearing 34*a* as an example of a bearing. In addition, a rear end portion of the rotation guide member 31 is connected to the first driving portion 4.

In the rotation guide member 31, groove portions 31*a* extending in the front-rear direction indicated by the arrows A1 and A2 along the axial direction of the driver bit 2 are formed at two positions of a circumferential surface facing each other in a radial direction. The rotation guide member 31 penetrates the holding member 30 in the radial direction and is connected to the holding member 30 via a connection member 30*b* protruding from both sides of the holding member 30 by the connection member 30*b* being inserted in the groove portions 31*a*.

The connection member 30*b* is formed of a cylindrical member having an elliptical cross-sectional shape, and a longitudinal direction of the elliptical shape is a direction along an extending direction of the groove portion 31*a* parallel to the axial direction of the driver bit 2 indicated by the arrows A1 and A2. In addition, a lateral direction of the elliptical shape of the connection member 30*b* is a direction orthogonal to the extending direction of the groove portion 31*a* indicated by arrows B1 and B2, that is, a direction along a rotation direction of the rotation guide member 31. A width of the connection member 30*b* in the lateral direction of the elliptical shape, that is, a width of the rotation guide member 31 along the rotation direction is slightly smaller than a width of the groove portion 31*a* along the same direction.

Accordingly, the connection member 30*b* inserted into the groove portions 31*a* is supported by the groove portions 31*a* to be movable along the axial direction of the rotation guide member 31. In addition, movement of the connection member 30*b* along the rotation direction with respect to the rotation guide member 31 is restricted between one side surface and the other side surface of the groove portion 31*a* along the extending direction of the groove portion 31*a*. Accordingly, when the rotation guide member 31 rotates, the connection member 30*b* is pressed by one side surface or the other side surface of the groove portion 31*a* according to the rotation direction of the rotation guide member 31 and receives a force in a circumferential direction, which is the rotation direction, from the rotation guide member 31.

Therefore, when the rotation guide member 31 rotates, the connection member 30*b* is pressed by the groove portions 31*a* of the rotation guide member 31, and thus the holding member 30 rotates together with the rotation guide member 31. In addition, the connection member 30*b* is guided by the groove portions 31*a* of the rotation guide member 31, and the holding member 30 moves in the front-rear direction along the axial direction of the driver bit 2.

The moving member 32 includes a first moving member 32*a* that rotates together with the holding member 30 and moves the holding member 30 in the front-rear direction along the rotation guide member 31, a second moving member 32*c* that is supported by the first moving member 32*a* via a bearing 32*b* and presses the first moving member 32*a* via the bearing 32*b*, and a buffer member 32*d* attached to a rear side of the second moving member 32*c*.

The first moving member 32*a* is formed of, for example, a cylindrical member having an inner diameter slightly greater than an outer diameter of the rotation guide member 31 and inserted outside the rotation guide member 31. The first moving member 32*a* is connected to the holding member 30 via the connection member 30*b* protruding from the groove portion 31*a* of the rotation guide member 31 and is thereby supported movably along the axial direction of the rotation guide member 31.

The bearing 32*b* is an example of a bearing and is inserted between an outer periphery of the first moving member 32*a* and an inner periphery of the second moving member 32*c*. The first moving member 32*a* constitutes a bearing inner ring holding member that holds an inner ring of the bearing 32*b*, and the second moving member 32*c* constitutes a bearing outer ring holding member that holds an outer ring of the bearing 32*b*. The inner ring of the bearing 32*b* is supported on the outer periphery of the first moving member 32*a* so as not to be movable in the rotation direction and the axial direction, and the outer ring of the bearing 32*b* is supported on the inner periphery of the second moving member 32*c* so as not to be movable in the rotation direction and the axial direction.

As a result, the second moving member 32*c* is connected to the first moving member 32*a* via the bearing 32*b* in a state in which the movement in the front-rear direction along the axial direction is restricted. In addition, the second moving member 32*c* rotatably supports the first moving member 32*a* via the bearing 32*b*.

Therefore, when the second moving member 32*c* moves in the front-rear direction along the axial direction, the first moving member 32*a* is pressed by the second moving member 32*c* via the bearing 32*b* and moves in the front-rear direction along the axial direction together with the second moving member 32*c*. The first moving member 32*a* is rotatable to the second moving member 32*c* which is not rotatable to the rotation guide member 31.

The biasing member 33 is formed of a coil spring in this example, is inserted between the front frame 10*b* provided on a front side of a case 10*a* of the tool body 10 and the second moving member 32*c* of the moving member 32 on an outer side of the rotation guide member 31, and comes into contact with a spring seat 32*f* disposed to come into contact with an end surface of the outer ring of the bearing 32*b*. The biasing member 33 is compressed when the moving member 32 moves in the front direction indicated by the arrow A1, and applies a force to the moving member 32 to press the moving member 32 in the rear direction indicated by the arrow A2.

The first driving portion 4 includes a speed reducer 41 and a bit rotation motor 40 driven by electricity supplied from the battery 12. The bit rotation motor 40 is an example of a first motor, a shaft 40*a* of the bit rotation motor 40 is connected to the speed reducer 41, and a shaft 41*a* of the speed reducer 41 is connected to the rotation guide member 31. The first driving portion 4 has a configuration in which the speed reducer 41 uses a planetary gear, and the bit rotation motor 40 is disposed coaxially with the rotation guide member 31, the holding member 30, and the driver bit 2 held by the holding member 30.

In the first driving portion 4, the bit rotation motor 40 and the speed reducer 41 are attached to a rear frame 10*c* provided on a rear side of the case 10*a* of the tool body 10, and the shaft 41*a* of the speed reducer 41 is supported by the rear frame 10*c* via the bearing 42. The rear end portion of the rotation guide member 31 is connected to the shaft 41*a* of the speed reducer 41 and the shaft 41*a* is supported by the rear frame 10*c* via the bearing 42, and thus the rotation guide member 31 is rotatably supported via the bearing 42, which is an example of a bearing.

The bit holding portion 3 and the first driving portion 4 are integrally assembled by connecting the front frame 10*b* and the rear frame 10$c$ by a coupling member 10$d$ extending in the front-rear direction, and the front frame 10$b$ is fixed to the case 10$a$ of the tool body 10 by a screw 10$e$.

In the bit holding portion 3, the front end portion of the rotation guide member 31 is supported by the front frame 10$b$ fixed to the front side of the case 10$a$ of the tool body 10 via the bearing 34$a$, and the rear end portion of the rotation guide member 31 is supported by the rear frame 10$c$ fixed to the rear side of the case 10$a$ via the shaft 41$a$ of the speed reducer 41 and the bearing 42. Therefore, in the bit holding portion 3, the rotation guide member 31 is rotatably supported by the tool body 10.

Accordingly, the first driving portion 4 causes the bit rotation motor 40 to rotate the rotation guide member 31. When the rotation guide member 31 rotates, the connection member 30$b$ is pressed by the groove portions 31$a$ of the rotation guide member 31, and thus the holding member 30 holding the driver bit 2 rotates together with the rotation guide member 31.

In the bit holding portion 3, guide members 32$g$ are provided on the second moving member 32$c$. When the guide member 32$g$ is guided by the coupling member 10$d$, the second moving member 32$c$ is movable in the front-rear direction indicated by the arrows A1 and A2 along the axial direction of the driver bit 2 and is restricted from rotating following the rotation guide member 31.

Next, the second driving portion 5 will be described with reference to each drawing. The second driving portion 5 includes a speed reducer 51 and a bit movement motor 50 driven by the electricity supplied from the battery 12. The bit movement motor 50 is an example of a second motor, a shaft 50$a$ of the bit movement motor 50 is connected to the speed reducer 51, and a shaft 51$a$ of the speed reducer 51 is connected to a pulley 52, which is an example of a transmission member. In the second driving portion 5, the pulley 52 is supported by the tool body 10 via a bearing 53. In the second driving portion 5, the shaft 50$a$ of the bit movement motor 50 is disposed along an extending direction of the handle 11.

In the second driving portion 5, one end of a linear wire 54 as an example of the transmission member is connected to the pulley 52, and the wire 54 is wound around the pulley 52 by rotation of the pulley 52. The other end of the wire 54 is connected to a wire connection portion 32$h$ provided on the second moving member 32$c$ of the moving member 32.

Accordingly, the second driving portion 5 causes the bit movement motor 50 to rotate the pulley 52 to wind up the wire 54, thereby causing the second moving member 32$c$ to move in the front direction indicated by the arrow A1. In the bit holding portion 3, when the second moving member 32$c$ moves in the front direction, the first moving member 32$a$ is pressed via the bearing 32$b$ and moves in the front direction along the axial direction together with the second moving member 32$c$. When the first moving member 32$a$ moves in the front direction, the holding member 30 connected to the first moving member 32$a$ via the connection member 30$b$ moves in the front direction, and the driver bit 2 held by the holding member 30 moves in the front direction indicated by the arrow A1.

The second driving portion 5 is disposed to be offset to one side with respect to a substantial center in the left-right direction of the fastening tool 1 so that a tangential direction of a portion of the pulley 52 around which the wire 54 is wound is along an extending direction of the rotation guide member 31. Further, in order to move the driver bit 2 by a predetermined amount, a diameter and the like of the pulley 52 are set so that the wire 54 is not wound around the pulley 52 in an overlapping manner when the pulley 52 winds the wire 54.

Accordingly, a relation between a rotation amount of the bit movement motor 50 and the movement amount of the holding member 30 is a one-to-one relation over an entire movable range of the holding member 30, and the movement amount of the holding member 30 along the axial direction of the rotation guide member 31 may be controlled by controlling the rotation amount of the bit movement motor 50. That is, it is possible to control a movement amount of the driver bit 2 attached to the holding member 30 by controlling the rotation amount of the bit movement motor 50.

It is also possible to increase a movement speed of the driver bit 2 according to a rotation speed of the bit movement motor 50. Therefore, it is possible to shorten a time until the screw 200 is pressed against the fastening target by the driver bit 2.

The wire 54 is flexible enough to be wound around the pulley 52, and cannot thus press the second moving member 32$c$ to move the moving member 32 rearward. Therefore, the biasing member 33 is provided which is compressed when the moving member 32 moves in the front direction indicated by the arrow A1 and applies a force to the moving member 32 to press the moving member 32 in the rear direction indicated by the arrow A2. As a result, the wire 54 is wound by the pulley 52, and the driver bit 2 moves forward so that the driver bit 2 after the forward movement may be moved backward.

Figure 4:
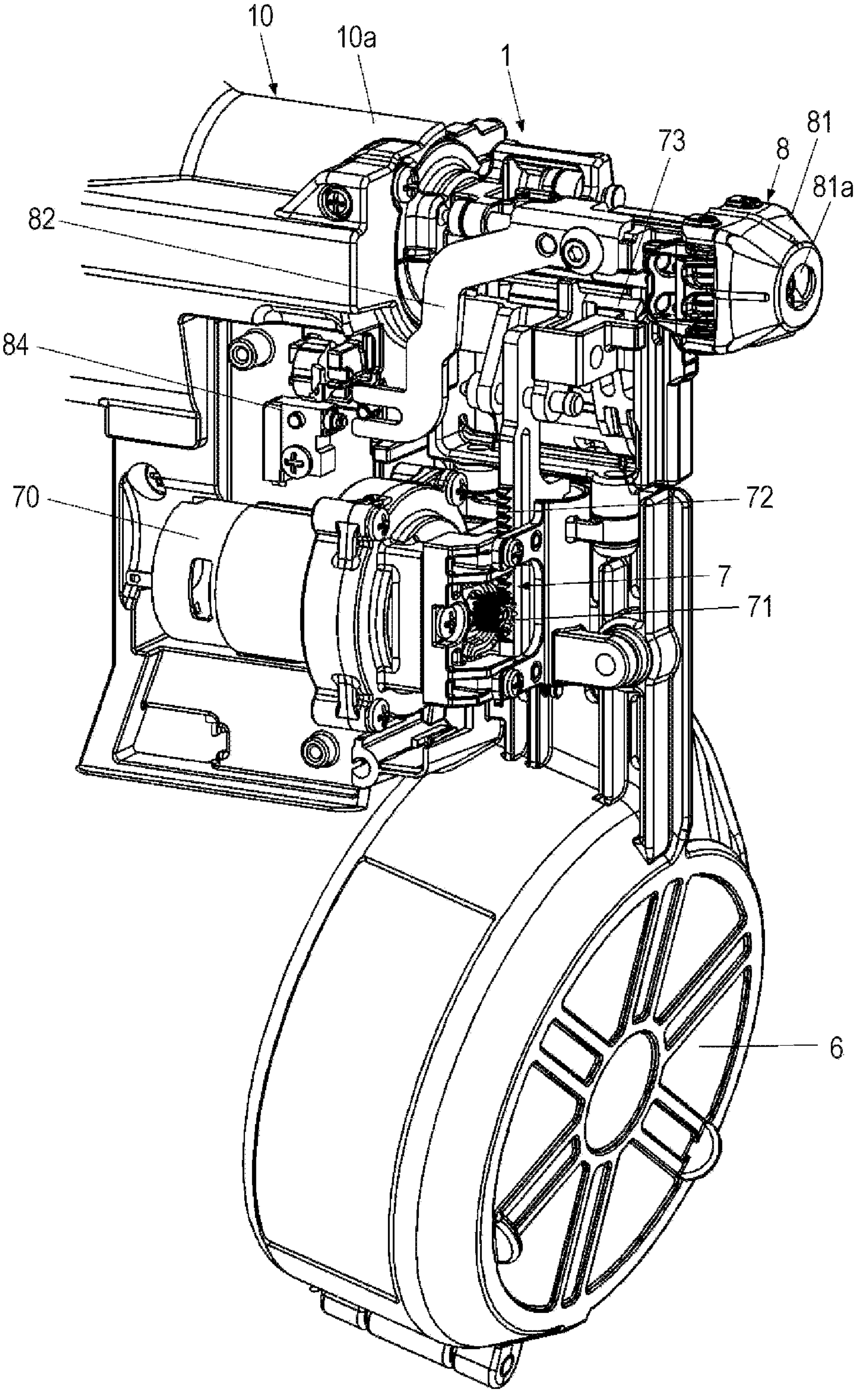
FIG. 4 is a perspective view showing an example of a screw feed portion and a nose portion of the present embodiment.

FIG. 4 is a perspective view showing an example of a screw feed portion and a nose portion according to the present embodiment. Next, the screw feed portion 7 and the nose portion 8 will be described with reference to each drawing. The screw feed portion 7 includes a screw feed motor 70, a pinion gear 71 attached to a shaft of the screw feed motor 70 via a speed reducer, a rack gear 72 engaged with the pinion gear 71, and an engagement portion 73 connected to the rack gear 72 and engaged with the connection screw fed from the screw storage portion 6.

In the screw feed portion 7, the rack gear 72 is supported to be movable in the up-down direction along a feeding direction of the connection screw. In the screw feed portion 7, when the screw feed motor 70 normally and reversely rotates, the engagement portion 73 engaged with the connection screw reciprocates in the up-down direction, and the connection screw is fed. The screw feed portion 7 may reciprocate the engagement portion 73 by a driving portion that linearly moves by a combination of a biasing unit and an electromagnetic force such as a solenoid.

The nose portion 8 includes an injection passage 80 through which the driver bit 2 passes when the screw 200 is supplied from the screw feed portion 7. The nose portion 8 also includes a contact member 81 that has an injection port 81$a$ communicating with the injection passage 80 and comes into contact with the fastening target. The nose portion 8 further includes a contact arm 82 that moves in the front-rear direction in conjunction with the contact member 81.

In the nose portion 8, the contact member 81 is movably supported in the front-rear direction indicated by the arrows A1 and A2, and the contact arm 82 moves in the front-rear direction in conjunction with the contact member 81. In the nose portion 8, the contact member 81 is biased in the front direction by a biasing member (not shown), and the contact member 81 which is pressed against the fastening target and moves rearward is biased by the biasing member to move in the front direction.

The fastening tool 1 includes a contact switch portion 84 that operates by being pressed by the contact arm 82. When the contact member 81 is pressed against the fastening target and moves rearward, the contact arm 82 moves reward, and thus the contact switch portion 84 is pressed by the contact arm 82, whereby presence or absence of the operation is switched. In this example, a state where the contact switch portion 84 is not pressed by the contact arm 82 and is not operated is referred to as an OFF state of the contact switch portion 84, and a state where the contact switch portion 84 is pressed by the contact arm 82 and is operated is referred to as an ON state of the contact switch portion 84.

Figure 5:
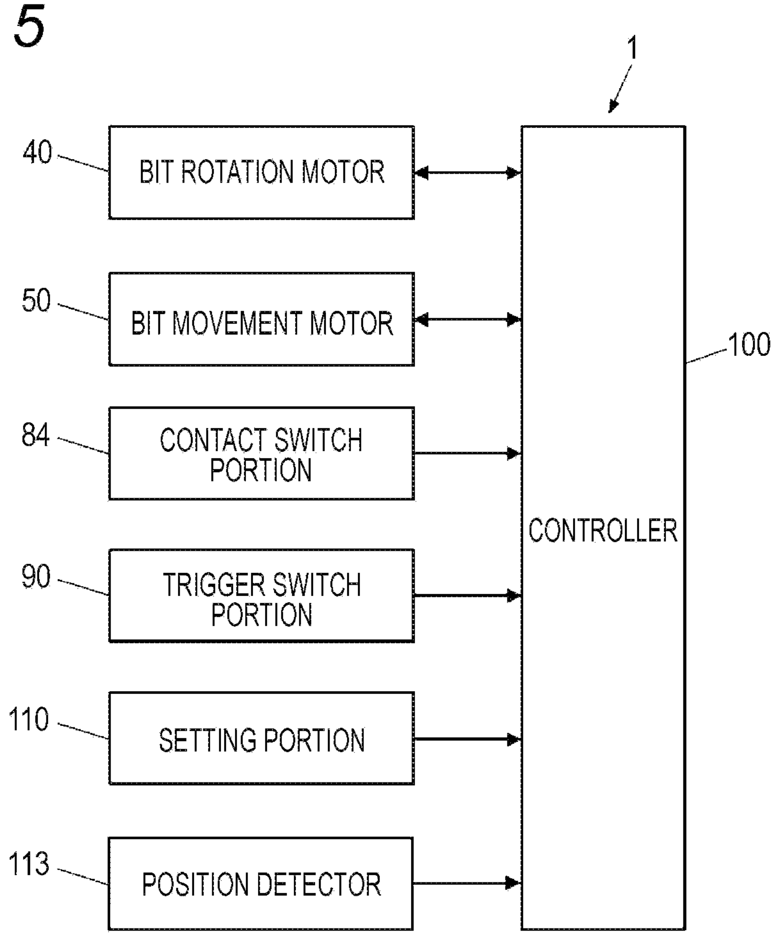
FIG. 5 is a block diagram showing an example of the fastening tool of the present embodiment.

FIG. 5 is a block diagram showing an example of the fastening tool of the present embodiment. Next, a configuration related to control and operation of the fastening tool 1 will be described with reference to each drawing.

The fastening tool 1 includes a trigger 9 that receives an operation and a trigger switch portion 90 that operates in response to the operation of the trigger 9. As shown in FIG. 1A and the like, the trigger 9 is an example of an operation portion, is provided on a front side of the handle 11, and is operable by fingers of a hand gripping the handle 11. The trigger switch portion 90 is an example of an operation switch portion and is operated by being pressed by the trigger 9.

The trigger switch portion 90 is pressed by the trigger 9 to switch the presence or absence of the operation, and in this example, a state where the trigger 9 is not operated and the trigger switch portion 90 is not pressed by the trigger 9 and is not operated is referred to as an OFF state of the trigger switch portion 90, and a state where the trigger 9 is operated and the trigger switch portion 90 is pressed by the trigger 9 and is operated is referred to as an ON state of the trigger switch portion 90.

The fastening tool 1 includes a controller 100 that controls the first driving portion 4, the second driving portion 5, and the screw feed portion 7 based on output of the trigger switch portion 90 that is operated by the operation of the trigger 9 and the contact switch portion 84 that is operated by being pressed by the contact member 81. The controller 100 is configured by a substrate on which various electronic components are mounted, and as shown in FIG. 1A, is stored in a substrate storage portion 111 provided on a back side of the screw storage portion 6 between the screw storage portion 6 and the handle 11.

The controller 100 controls whether to drive the bit movement motor 50 of the second driving portion 5 and the bit rotation motor 40 of the first driving portion 4 based on a combination of whether the contact switch portion 84 is in the ON state or the OFF state and whether the trigger switch portion 90 is in the ON state or the OFF state.

As described above, the fastening tool 1 includes the first driving portion 4 which rotates the driver bit 2 held by the holding member 30 in the bit holding portion 3 by the driving of the bit rotation motor 40. The fastening tool 1 also includes the second driving portion 5 which moves the driver bit 2 held by the holding member 30 in the bit holding portion 3 in the front-rear direction along the axial direction by the driving of the bit movement motor 50.

In the fastening tool 1, when the bit movement motor 50 rotates in a predetermined direction, the driver bit 2 held by the holding member 30 in the bit holding portion 3 moves in the front direction indicated by the arrow A1 (moves forward). In the fastening tool 1, when the bit rotation motor 40 rotates in a predetermined direction, the driver bit 2 rotates in a direction in which the screw 200 is fastened.

The fastening tool 1 moves the driver bit 2 forward by the rotation of the bit movement motor 50 to engage the driver bit 2 with the recess 200*a* of the screw 200, and moves the screw 200 in the front direction to press the screw 200 against the fastening target.

In addition, the fastening tool 1 rotates the driver bit 2 by the rotation of the bit rotation motor 40 in a direction in which the screw 200 is fastened to fasten the screw 200 engaged with the driver bit 2 to the fastening target.

Further, the fastening tool 1 rotates the bit movement motor 50 in conjunction with the rotation of the bit rotation motor 40 to move the driver bit 2 forward following the fastening of the screw 200.

Therefore, the controller 100 controls the movement amount (forward movement amount) of the driver bit 2 by controlling the rotation amount of the bit movement motor 50. The controller 100 controls a stop position along the axial direction of the driver bit 2 by controlling the movement amount of the driver bit 2.

In addition, the controller 100 controls a rotation speed of the bit rotation motor 40 and the rotation speed of the bit movement motor 50 to move the driver bit 2 forward following the fastening of the screw 200.

The fastening tool 1 includes a position detector 113 that detects a position of the bit holding portion 3 along the axial direction of the driver bit 2 in order to control the movement amount (forward movement amount) of the driver bit 2 by the controller 100. The position detection portion 113 detects the rotation amount of the bit movement motor 50 and detects the position of the bit holding portion 3 based on the rotation amount of the bit movement motor 50. The controller 100 determines whether the bit holding portion 3 moves to a predetermined forward movement end position based on the position of the bit holding portion 3 detected by the position detector 113. A function of the position detector 113 may be implemented by the controller 100.

The controller 100 sets a first condition for determining whether the bit holding portion 3 moves to the forward movement end position along the axial direction and sets a second condition as a stop condition for determining whether to stop the rotation of the bit rotation motor 40 and the bit movement motor 50. When it is determined that the movement of the bit holding portion 3 to the forward movement end position is not detected in detection based on the first condition, the controller 100 stops the rotation of the bit rotation motor 40 and the bit movement motor 50 based on the second condition.

As the first condition, the controller 100 controls a position along the axial direction of the bit holding portion 3 based on the rotation amount of the bit movement motor 50. Therefore, the controller 100 sets a defined rotation amount of the bit movement motor 50 from start of the rotation of the bit movement motor 50 to the movement of the bit holding portion 3 to the predetermined forward movement end position along the axial direction.

When an abnormality occurs in which the position along the axial direction of the driver bit 2 cannot be controlled based on the rotation amount of the bit movement motor 50, the controller 100 sets an abnormality detection rotation amount of the bit rotation motor 40 for detecting the occurrence of the abnormality based on the rotation amount of the bit rotation motor 40 as the second condition for determining whether to stop the rotation of the bit movement motor 50 and the bit rotation motor 40.

When the rotation amount of the bit movement motor 50 cannot reach the defined rotation amount and the rotation amount of the bit rotation motor 40 reaches the abnormality detection rotation amount from the start of the rotation of the bit rotation motor 40 and the bit movement motor 50, the controller 100 determines that the stop conditions of the bit rotation motor 40 and the bit movement motor 50 are satisfied and stops the rotation of the bit rotation motor 40 and the bit movement motor 50.

Further, when the abnormality occurs in which the position along the axial direction of the driver bit 2 cannot be controlled based on the rotation amount of the bit movement motor 50, the controller 100 sets an abnormality detection defined time for detecting the occurrence of the abnormality based on an elapsed time from start of the fastening operation of the screw 200 as the second condition for determining whether to stop the rotation of the bit movement motor 50 and the bit rotation motor 40. As the elapsed time from the start of the fastening operation of the screw 200, for example, the abnormality detection defined time for detecting the occurrence of the abnormality is set based on an elapsed time from start of the rotation of the bit movement motor 50.

When the rotation amount of the bit movement motor 50 cannot reach the defined rotation amount and the time from the start of the rotation of the bit movement motor 50 reaches the abnormality detection defined time from the start of the rotation of the bit rotation motor 40 and the bit movement motor 50, the controller 100 stops the rotation of the bit rotation motor 40 and the bit movement motor 50.

Before it is determined that the movement of the bit holding portion 3 to the forward movement end position is detected based on the rotation amount of the bit movement motor 50, when the trigger switch portion 90 becomes the OFF state by the operation of the trigger 9, the controller 100 continues the rotation of the bit rotation motor 40 and the bit movement motor 50.

The controller 100 identifies the fastening target and stops the rotation of the bit rotation motor 40 and the bit movement motor 50 based on the second condition in a case where the fastening target is a material that may not be able to fasten the screw 200. In addition, in the case where the fastening target is the material that may not be able to fasten the screw 200, when the trigger switch portion 90 becomes the OFF state by the operation of the trigger 9, the controller 100 stops the rotation of the bit rotation motor 40 and the bit movement motor 50.

Figure 6:
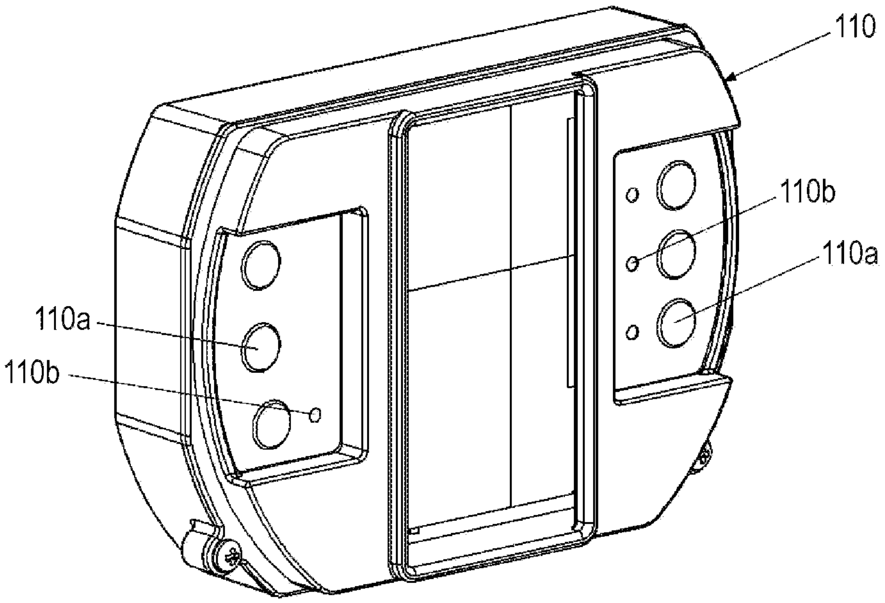
FIG. 6 is a perspective view showing an example of a setting portion.

The fastening tool 1 includes a setting portion 110 in which the rotation amount or the like of the bit movement motor 50, which defines the forward movement amount of the driver bit 2, is set. FIG. 6 is a perspective view showing an example of a setting portion. Next, the setting portion 110 will be described with reference to each drawing.

The setting portion 110 is an example of a setting unit and may select any setting value from a plurality of setting values or any setting value continuously.

In this example, in the setting portion 110, the setting value is selected by an operation portion 110*a* configured by a button. In the operation portion 110*a*, the setting value may be selected by a rotary dial. The setting portion 110 may display the selected setting value by a method of indicating a current value with a label, a mark, or the like, a method of indicating the current value on a display portion 110*b* such as an LED, or the like so that an operator may easily grasp a current setting value. Contents displayed on the display portion 110*b* include, in addition to a setting value of a screw depth defined by the forward movement amount of the driver bit 2, an ON/OFF state of a power supply, an operation mode selected from various selectable operation modes, presence or absence of the screw, a remaining amount of the screw, and presence or absence of an abnormality.

The setting portions 110 are provided on both left and right sides of a surface facing the handle 11 in the substrate storage portion 111 provided on the back side of the screw storage portion 6.

Accordingly, when the fastening tool 1 is viewed from the rear, the setting portions 110 may be visually recognized from both the left and right sides of the handle 11.

Operation Example of Fastening Tool of the Present Embodiment

Figure 7A:
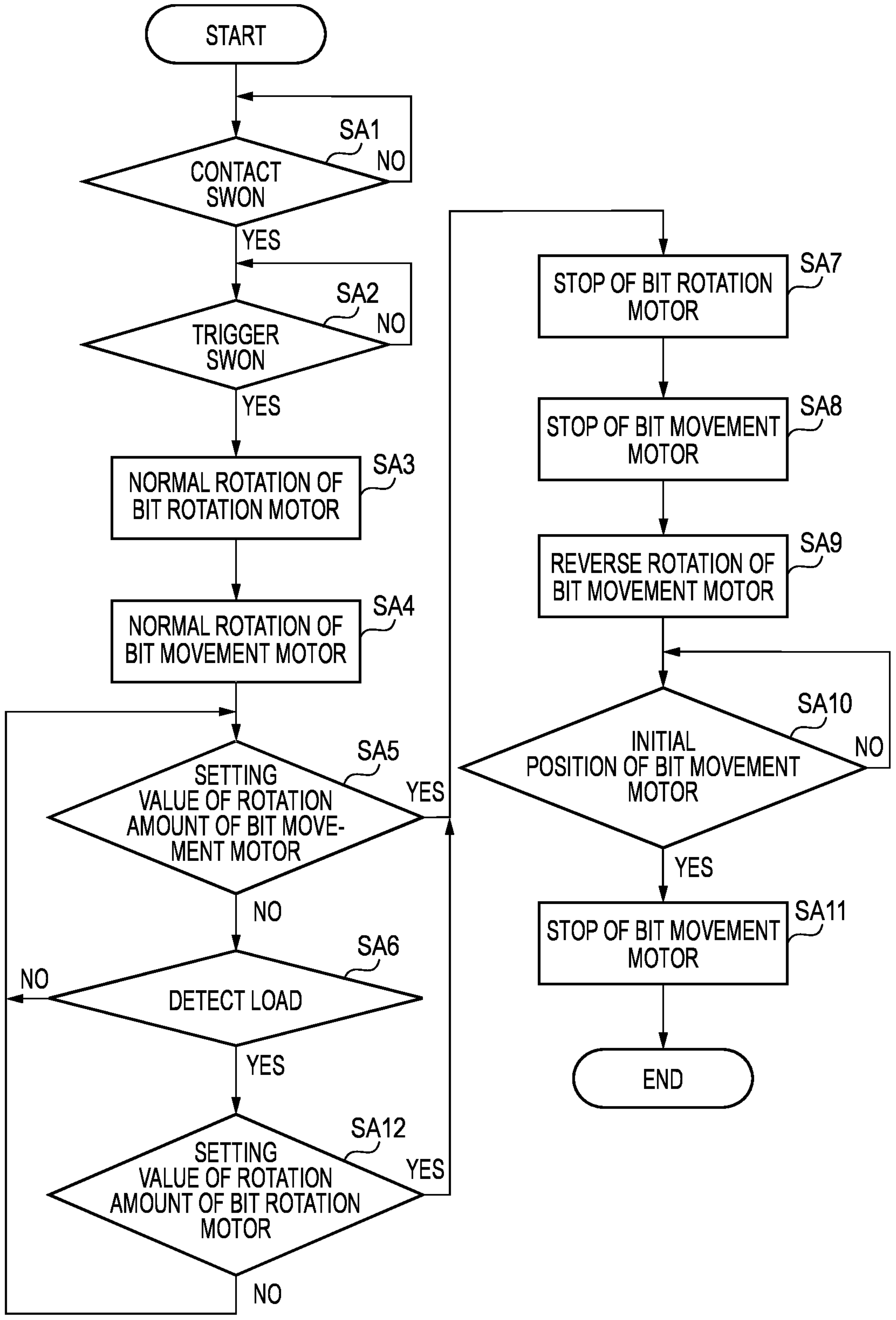
FIG. 7A is a flowchart showing an example of an operation of the fastening tool of the present embodiment.
Figure 7B:
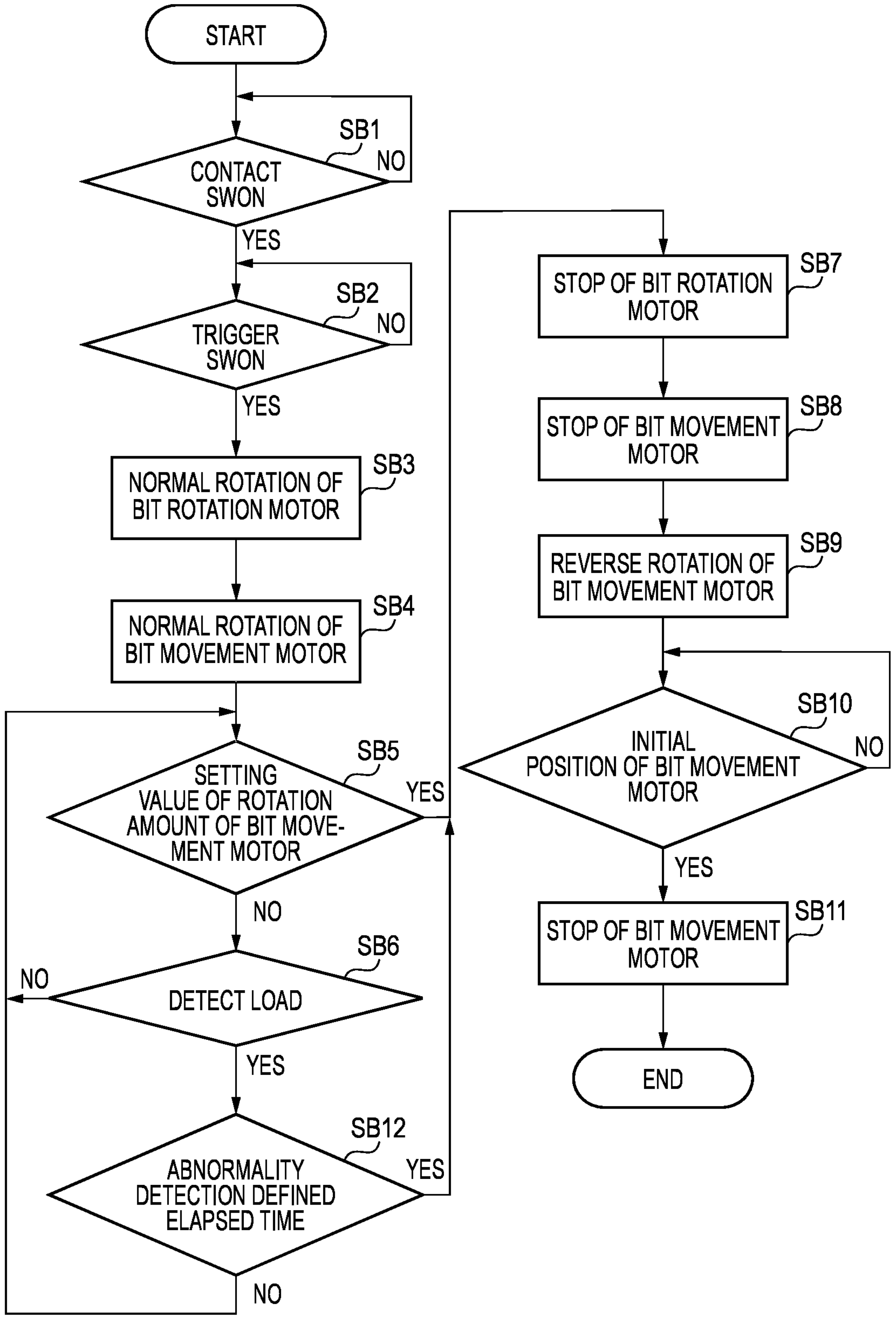
FIG. 7B is a flowchart showing an example of the operation of the fastening tool of the present embodiment.
Figure 7C:
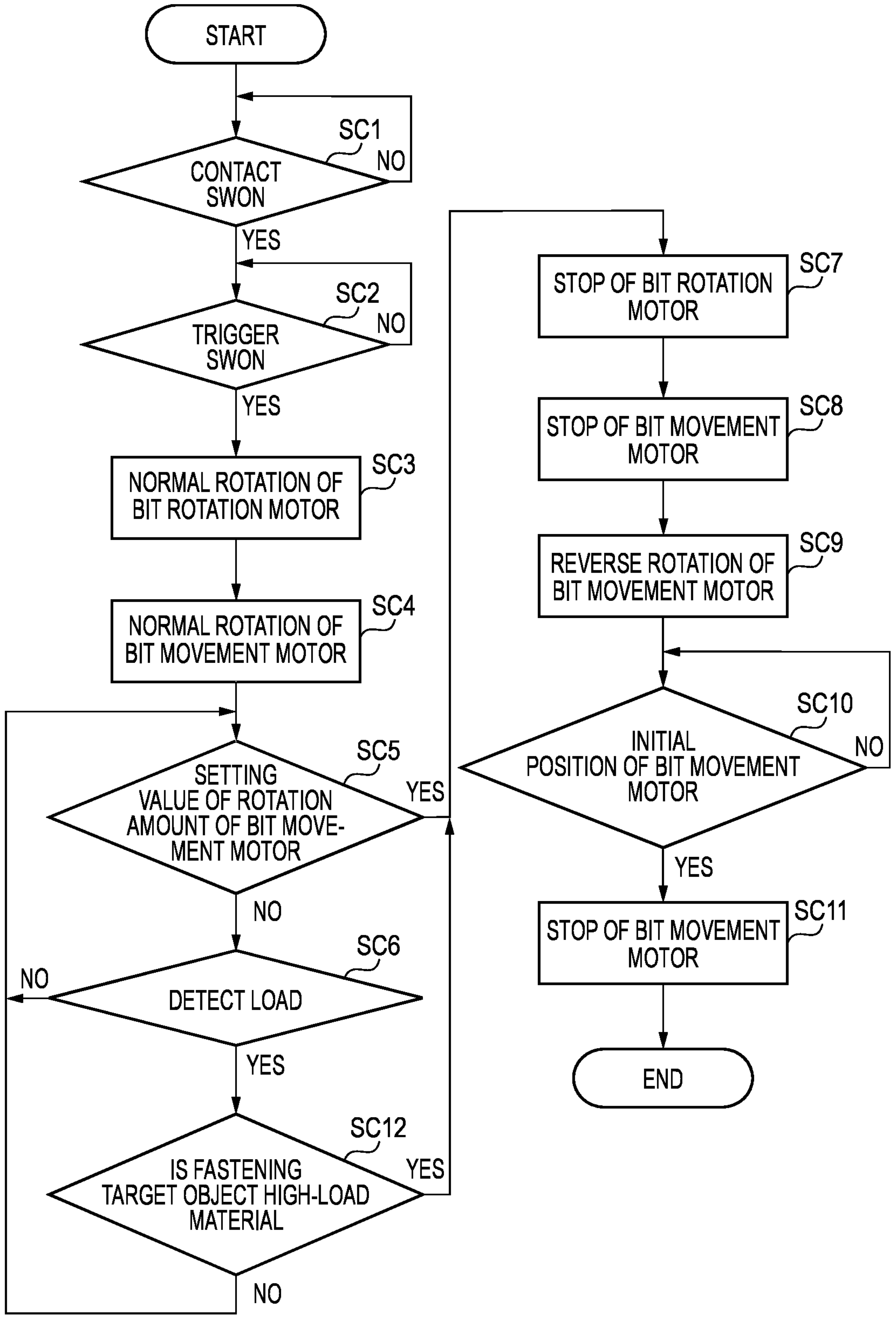
FIG. 7C is a flowchart showing an example of an operation of the fastening tool of the present embodiment.
Figure 8A:
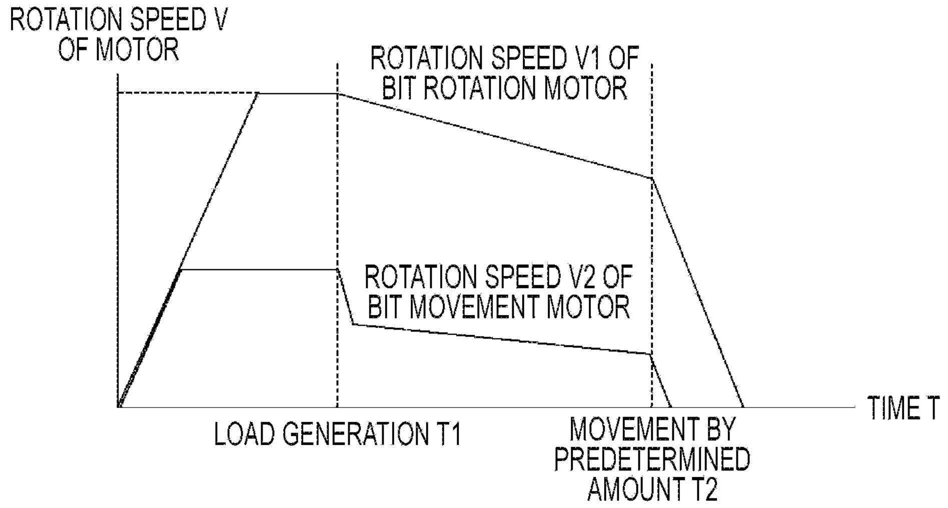
FIG. 8A is a graph showing a relation between rotation speeds of a bit rotation motor and a bit movement motor.
Figure 8B:
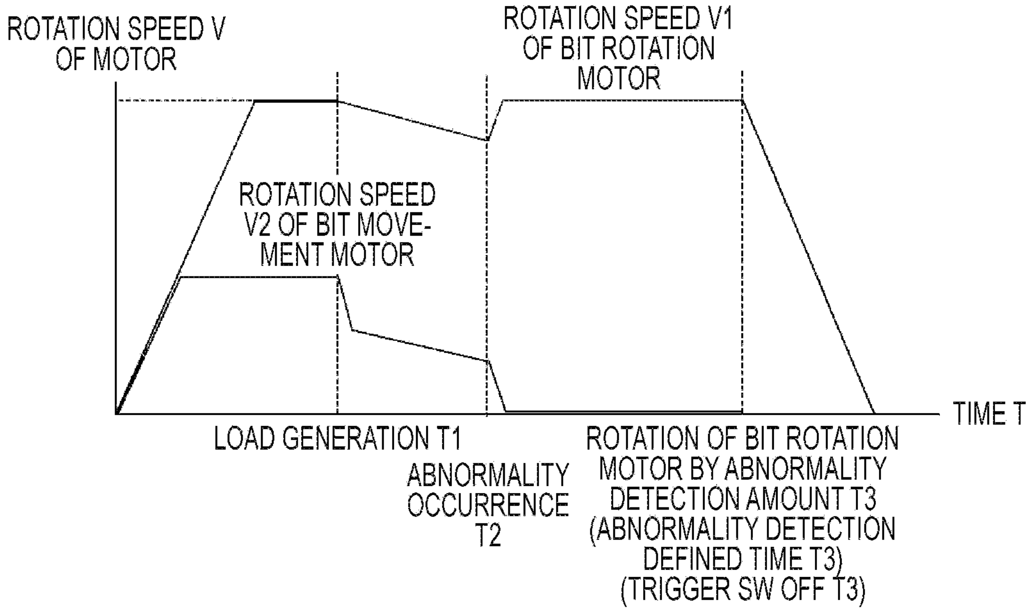
FIG. 8B is a graph showing the relation between the rotation speeds of the bit rotation motor and the bit movement motor.

FIGS. 7A, 7B, and 7C are flowcharts showing an example of the operation of the fastening tool of the present embodiment, and FIGS. 8A and 8B are graphs showing a relation between the rotation speeds of the bit rotation motor and the bit movement motor. Next, the fastening operation of the fastening tool of the present embodiment will be described with reference to each drawing.

FIG. 7A shows control of determining whether the rotation amount of the bit rotation motor 40 reaches the abnormality detection rotation amount to stop the rotation of the bit movement motor 50 and the bit rotation motor 40. FIG. 7B shows control of determining whether the time from the start of the rotation of the bit movement motor 50 reaches the abnormality detection defined time to stop the rotation of the bit movement motor 50 and the bit rotation motor 40. FIG. 7C shows control of determining the material of the fastening target and detecting the OFF state of the trigger switch portion 90 to stop the rotation of the bit movement motor 50 and the bit rotation motor 40.

In a standby state of the fastening tool 1, as shown in FIG. 1A, a tip of the driver bit 2 is positioned at a standby position P1 behind the injection passage 80, and the screw 200 may be supplied to the injection passage 80.

In the fastening tool 1, the contact member 81 is pressed against the fastening target, the contact switch portion 84 is pressed by the contact arm 82, and thus the contact switch portion 84 becomes the ON state. In the fastening tool 1, the trigger 9 is operated, and thus the trigger switch portion 90 becomes the ON state.

First, when the control in FIG. 7A is described, when the contact switch portion 84 becomes the ON state in step SA1 of FIG. 7A and the trigger switch portion 90 becomes the ON state in step SA2, the controller 100 drives the bit rotation motor 40 of the first driving portion 4 in step SA3 and drives the bit movement motor 50 of the second driving portion 5 in step SA4.

When the bit movement motor 50 is driven to rotate in a forward direction, which is one direction, the pulley 52 rotates in the forward direction so that the wire 54 is wound around the pulley 52. When the wire 54 is wound around the pulley 52, the second moving member 32*c* connected to the wire 54 is guided by the rotation guide member 31 and moves in the front direction along the axial direction. When the second moving member 32*c* moves in the front direction, the first moving member 32*a* is pressed to the second moving member 32*c* via the bearing 32*b* and moves in the front direction along the axial direction while compressing the biasing member 33 together with the second moving member 32*c*.

When the first moving member 32*a* moves in the front direction, the holding member 30 connected to the first moving member 32*a* by the connection member 30*b* moves in the front direction along the axial direction of the driver bit 2 while the connection member 30*b* is guided by the groove portion 31*a* of the rotation guide member 31.

Accordingly, the driver bit 2 held by the holding member 30 moves in the front direction indicated by the arrow A1, engages with the screw 200 supplied to the injection port 81*a* of the nose portion 8 to move the screw 200 in the front direction and press the screw 200 against the fastening target.

When the bit rotation motor 40 is driven to rotate in the forward direction, which is one direction, the rotation guide member 31 rotates in the forward direction. When the rotation guide member 31 rotates in the forward direction, the connection member 30*b* connected to the holding member 30 is pressed to the groove portion 31*a* of the rotation guide member 31 so that the holding member 30 rotates together with the rotation guide member 31.

Accordingly, the driver bit 2 held by the holding member 30 rotates the screw 200 in the forward direction (clockwise) to fasten the screw 200 to the fastening target. The controller 100 moves the driver bit 2 in the front direction by the second driving portion 5 based on a load applied to the bit rotation motor 40, the number of rotations of the bit rotation motor 40, a load applied to the bit movement motor 50, and the number of rotations of the bit movement motor 50 in conjunction with the operation of rotating the driver bit 2 by the first driving portion 4 to fasten the screw 200 to the fastening target, thereby causing the driver bit 2 to follow the screw 200 fastened to the fastening target.

FIG. 8A shows the relation of the rotation speeds between the bit rotation motor 40 and the bit movement motor 50 when the screw 200 is normally fastened to a normal fastening target such as wood or gypsum. In contrast, FIG. 8B shows a relation between the rotation speeds of the bit rotation motor 40 and the bit movement motor 50 in a case where the screw 200 cannot be normally fastened to a fastening target in which gypsum or the like is superimposed on a base of a steel sheet.

When the rotation amount of the bit movement motor 50 becomes the setting value selected by the setting portion 110 or the like, the controller 100 determines in step SA5 whether the tip of the driver bit 2 reaches a set forward movement end position.

When determining in step SA5 described above that the rotation amount of the bit movement motor 50 does not reach a predetermined setting value, the controller 100 detects a load applied to the driver bit 2 via the screw 200 in step SA6.

When the operation of rotating the driver bit 2 to fasten the screw 200 to the fastening target is started, the fastening tool 1 generates the load applied to the driver bit 2 via the screw 200. When the load applied to the driver bit 2 is generated, a rotation speed V1 of the bit rotation motor 40 and a rotation speed V2 of the bit movement motor 50 both decrease. Therefore, the load generated by screw fastening may be detected based on a reduction amount or the like of the rotation speed V2 of the bit movement motor 50.

In the fastening tool 1, a case where the screw 200 is fastened to the fastening target of various materials is considered, but the load applied to the driver bit 2 via the screw 200 is different between a case where the screw 200 is fastened to the normal fastening target such as wood or gypsum and a case where the screw 200 is fastened to the fastening target in which gypsum is superimposed on a base of a steel sheet.

In the case where the fastening target is a steel sheet, when the tip of the screw 200 reaches the steel sheet, a load when the screw 200 is pressed against the steel sheet is larger than that of wood or gypsum, and a load when the driver bit 2 is moved (moved forward) in the axial direction is larger.

However, in the fastening tool 1, even in the case where the fastening target is the steel sheet, when the screw 200 reaches the steel sheet and an increase in the load when the driver bit 2 is moved (moved forward) in the axial direction is within a predetermined range, the screw 200 may be fastened to the fastening target by continuing the rotation of the bit rotation motor 40 and the bit movement motor 50.

Therefore, when it is determined that the load generated by the screw fastening is within a normal range in which the screw 200 may be fastened to the fastening target after the timing T1 at which the load is generated by the screw fastening shown in FIGS. 8A and 8B, the controller 100 continues control on the position along the axial direction of the driver bit 2 based on the rotation amount of the bit movement motor 50.

When it is determined in step SA5 described above that the rotation amount of the bit movement motor 50 reaches the predetermined setting value (defined rotation amount), the controller 100 stops the driving of the bit rotation motor 40 in step SA7 of FIG. 7A at a timing T2 when the driver bit 2 moves by a defined amount shown in FIG. 8A, stops the rotation of the bit movement motor 50 in the forward direction in step SA8, and then reversely rotates the bit movement motor 50 in step SA9.

When the bit movement motor 50 rotates in the reverse direction, which is the other direction, the pulley 52 rotates in the reverse direction so that the wire 54 is pulled out from the pulley 52. When the wire 54 is pulled out from the pulley 52, the biasing member 33 compressed by the movement in the front direction of the second moving member 32*c* extends and presses the second moving member 32*c* in the rear direction.

When being pressed in the rear direction by the biasing member 33, the second moving member 32*c* is guided by the rotation guide member 31 and moves in the rear direction along the axial direction. When the second moving member 32*c* moves in the rear direction, the first moving member 32*a* is pulled by the second moving member 32*c* via the bearing 32*b* and moves in the rear direction along the axial direction together with the second moving member 32*c*.

When the first moving member 32*a* moves in the rear direction, the holding member 30 connected to the first moving member 32*a* by the connection member 30*b* moves in the rear direction along the axial direction of the driver bit 2 while the connection member 30*b* is guided by the groove portion 31*a* of the rotation guide member 31.

When the bit movement motor 50 reversely rotates to an initial position at which the wire 54 is pulled out from the pulley 52 by a predetermined amount, and the holding member 30 and the moving member 32 move in the rear direction to a position at which the tip of the driver bit 2 returns to the standby position P1 in step SA10, the controller 100 stops the reverse rotation of the bit movement motor 50 in step SA11.

When the trigger switch portion 90 becomes the OFF state, the controller 100 rotates the screw feed motor 70 in one direction to lower the engagement portion 73. When the engagement portion 73 is lowered to a position at which the engagement portion 73 engages with a next screw 200, the controller 100 reversely rotates the screw feed motor 70 to raise the engagement portion 73 and supply the next screw 200 to the injection passage 80.

In contrast, in a case where the fastening target is a steel sheet or the like, when the screw 200 cannot be pressed against the steel sheet to drill a hole, the driver bit 2 cannot move (move forward) in the axial direction. In addition, when the screw 200 pressed by the driver bit 2 in the front direction is jammed in the injection passage 80 or the injection port 81*a*, the driver bit 2 cannot move (move forward) in the axial direction. When the driver bit 2 cannot move (move forward) in the axial direction, the rotation amount of the bit movement motor 50 does not reach the defined rotation amount.

In this way, an abnormality in which the screw 200 cannot be fastened to the fastening target may occur in the case where the load when the driver bit 2 is moved (moved forward) in the axial direction becomes larger due to factors such as the fact that the hole is not drilled in the fastening target by the screw 200 or the screw 200 is jammed in the injection passage 80 or the injection port 81*a*.

When such an abnormality occurs, the rotation amount of the bit movement motor 50 may not reach the predetermined setting value. In control of controlling the position in the axial direction of the driver bit 2 based on the rotation amount of the bit movement motor 50 and stopping the rotation of the bit movement motor 50, when the rotation amount of the bit movement motor 50 does not reach the predetermined setting value, the rotation of the bit movement motor 50 cannot be stopped.

Therefore, before the rotation amount of the bit movement motor 50 reaches the predetermined setting value, when determining in step SA6 described above that the increase in the load when the driver bit 2 is moved (moved forward) in the axial direction is equal to greater than the predetermined range, the controller 100 determines whether to stop the rotation of the bit movement motor 50 and the bit rotation motor 40.

The controller 100 determines in step SA12 whether the rotation amount of the bit rotation motor 40 reaches the abnormality detection rotation amount as the second condition for determining whether to stop the rotation of the bit movement motor 50 and the bit rotation motor 40.

In a case where the abnormality in which the screw 200 cannot be fastened to the fastening target occurs, the driver bit 2 idles with respect to the screw 200. Therefore, as shown in FIG. 8B, the rotation speed of the bit rotation motor 40 after a timing T2 of abnormality occurrence does not decrease as compared with the case where the tip of the screw 200 is fastened to the fastening target by drilling a hole in the fastening target. Therefore, it is possible to determine whether the abnormality in which the screw 200 cannot be fastened to the fastening target occurs based on the rotation speed of the bit rotation motor 40.

When determining that the rotation amount of the bit rotation motor 40 reaches the abnormality detection rotation amount, at a timing T3 when the rotation amount of the bit rotation motor 40 reaches the abnormality detection rotation amount shown in FIG. 8B, the controller 100 stops the rotation of the bit rotation motor 40 in step SA7 described above and stops the rotation of the bit movement motor 50 in step SA8.

Therefore, in the fastening tool 1 that controls the position along the axial direction of the driver bit 2 based on the rotation amount of the bit movement motor 50, when the rotation amount of the bit movement motor 50 does not reach the defined rotation amount and it is not possible to detect that the driver bit 2 reaches the forward movement end position due to factors such as the occurrence of the abnormality in which the screw 200 cannot be fastened to the fastening target, it is possible to stop the rotation of the bit rotation motor 40 and the bit movement motor 50 based on the rotation amount of the bit rotation motor 40.

Next, when the control in FIG. 7B is described, when the contact switch portion 84 becomes the ON state in step SB1 of FIG. 7B and the trigger switch portion 90 becomes the ON state in step SB2, the controller 100 drives the bit rotation motor 40 of the first driving portion 4 in step SB3 and drives the bit movement motor 50 of the second driving portion 5 in step SB4.

When the bit movement motor 50 is driven to rotate in the forward direction, which is one direction, the driver bit 2 held by the holding member 30 of the bit holding portion 3 moves in the front direction indicated by the arrow A1, engages with the screw 200 supplied to the injection port 81*a* of the nose portion 8 to move the screw 200 in the front direction and press the screw 200 against the fastening target.

When the bit rotation motor 40 is driven to rotate in the forward direction, which is one direction, the driver bit 2 held by the holding member 30 of the bit holding portion 3 rotates the screw 200 in the forward direction (clockwise) and fastens the screw 200 to the fastening target. The controller 100 moves the driver bit 2 in the front direction by the second driving portion 5 based on the load applied to the bit rotation motor 40, the number of rotations of the bit rotation motor 40, the load applied to the bit movement motor 50, and the number of rotations of the bit movement motor 50 in conjunction with the operation of rotating the driver bit 2 by the first driving portion 4 to fasten the screw 200 to the fastening target, thereby causing the driver bit 2 to follow the screw 200 fastened to the fastening target.

When the rotation amount of the bit movement motor 50 becomes the setting value (defined rotation amount) selected by the setting portion 110 or the like, the controller 100 determines in step SB5 whether the tip of the driver bit 2 reaches the set forward movement end position.

When determining in step SB5 described above that the rotation amount of the bit movement motor 50 does not reach the predetermined setting value, the controller 100 detects the load applied to the driver bit 2 via the screw 200 in step SB6.

When it is determined that the load generated by the screw fastening is within the normal range in which the screw 200 may be fastened to the fastening target after the timing T1 at which the load is generated by the screw fastening shown in FIGS. 8A and 8B, the controller 100 continues the control on the position along the axial direction of the driver bit 2 based on the rotation amount of the bit movement motor 50.

When it is determined in step SB5 described above that the rotation amount of the bit movement motor 50 reaches the predetermined setting value (defined rotation amount), the controller 100 stops the driving of the bit rotation motor 40 in step SB7 of FIG. 7B at the timing T2 when the driver bit 2 moves by the defined amount shown in FIG. 8A, stops the rotation of the bit movement motor 50 in the forward direction in step SB8, and then reversely rotates the bit movement motor 50 in step SB9.

When the bit movement motor 50 reversely rotates to the initial position at which the wire 54 is pulled out from the pulley 52 by a predetermined amount and the holding member 30 and the moving member 32 move in the rear direction to the position at which the tip of the driver bit 2 returns to the standby position P1 in step SB10, the controller 100 stops the reverse rotation of the bit movement motor 50 in step SB11.

In contrast, before the rotation amount of the bit movement motor 50 reaches the predetermined setting value, when determining in step SB6 described above that the increase in the load when the driver bit 2 is moved (moved forward) in the axial direction is equal to greater than the predetermined range, the controller 100 determines whether to stop the rotation of the bit movement motor 50 and the bit rotation motor 40.

The controller 100 determines in step SB12 whether a defined time is reached from the start of the rotation of the bit movement motor 50 as the second condition for determining whether to stop the rotation of the bit movement motor 50 and the bit rotation motor 40.

A time from the start of rotation of the bit movement motor 50 until the rotation amount of the bit movement motor 50 reaches the setting value (defined rotation amount) and the tip of the driver bit 2 reaches the predetermined forward movement end position is determined by the rotation speed of the bit movement motor 50. However, when the abnormality in which the screw 200 cannot be fastened to the fastening target occurs, since the driver bit 2 cannot move (move forward) in the axial direction or the movement speed is lower than that in a normal state, the rotation amount of the bit movement motor 50 does not reach the defined rotation amount during a predetermined time. Therefore, it is possible to determine whether the abnormality in which the screw 200 cannot be fastened to the fastening target occurs based on the elapsed time from the start of the rotation of the bit movement motor 50.

When determining that the time from the start of the rotation of the bit movement motor 50 reaches the abnormality detection defined time, at the timing T3 when the time from the start of the rotation of the bit movement motor 50 reaches the abnormality detection defined time shown in FIG. 8B, the controller 100 stops the rotation of the bit rotation motor 40 in step SB7 described above and stops the rotation of the bit movement motor 50 in step SB8.

Therefore, in the fastening tool 1 that controls the position along the axial direction of the driver bit 2 based on the rotation amount of the bit movement motor 50, when the rotation amount of the bit movement motor 50 does not reach the defined rotation amount and it is not possible to detect that the driver bit 2 reaches the forward movement end position due to the factors such as the occurrence of the abnormality in which the screw 200 cannot be fastened to the fastening target, it is possible to stop the rotation of the bit rotation motor 40 and the bit movement motor 50 based on the elapsed time from the start of the rotation of the bit movement motor 50.

Next, when the control in FIG. 7C is described, when the contact switch portion 84 becomes the ON state in step SC1 of FIG. 7C and the trigger switch portion 90 becomes the ON state in step SC2, the controller 100 drives the bit rotation motor 40 of the first driving portion 4 in step SC3 and drives the bit movement motor 50 of the second driving portion 5 in step SC4.

When the bit movement motor 50 is driven to rotate in the forward direction, which is one direction, the driver bit 2 held by the holding member 30 of the bit holding portion 3 moves in the front direction indicated by the arrow A1, engages with the screw 200 supplied to the injection port 81*a* of the nose portion 8 to move the screw 200 in the front direction and press the screw 200 against the fastening target.

When the bit rotation motor 40 is driven to rotate in the forward direction, which is one direction, the driver bit 2 held by the holding member 30 of the bit holding portion 3 rotates the screw 200 in the forward direction (clockwise) and fastens the screw 200 to the fastening target. The controller 100 moves the driver bit 2 in the front direction by the second driving portion 5 based on the load applied to the bit rotation motor 40, the number of rotations of the bit rotation motor 40, the load applied to the bit movement motor 50, and the number of rotations of the bit movement motor 50 in conjunction with the operation of rotating the driver bit 2 by the first driving portion 4 to fasten the screw 200 to the fastening target, thereby causing the driver bit 2 to follow the screw 200 fastened to the fastening target.

When the rotation amount of the bit movement motor 50 becomes the setting value (defined rotation amount) selected by the setting portion 110 or the like, the controller 100 determines in step SC5 whether the tip of the driver bit 2 reaches the set forward movement end position.

When determining in step SC5 described above that the rotation amount of the bit movement motor 50 does not reach the predetermined setting value, the controller 100 detects the load applied to the driver bit 2 via the screw 200 in step SC6.

When it is determined that the load generated by the screw fastening is within the normal range in which the screw 200 may be fastened to the fastening target after the timing T1 at which the load is generated by the screw fastening shown in FIGS. 8A and 8B, the controller 100 continues the control on the position along the axial direction of the driver bit 2 based on the rotation amount of the bit movement motor 50.

When determining in step SC5 described above that the rotation amount of the bit movement motor 50 reaches the predetermined setting value (defined rotation amount), the controller 100 stops the driving of the bit rotation motor 40 in step SC7 of FIG. 7C at the timing T2 when the driver bit 2 moves by the defined amount shown in FIG. 8A, stops the rotation of the bit movement motor 50 in the forward direction in step SC8, and then reversely rotates the bit movement motor 50 in step SC9.

When the bit movement motor 50 reversely rotates to the initial position at which the wire 54 is pulled out from the pulley 52 by a predetermined amount and the holding member 30 and the moving member 32 move in the rear direction to the position at which the tip of the driver bit 2 returns to the standby position P1 in step SC10, the controller 100 stops the reverse rotation of the bit movement motor 50 in step SC11.

In contrast, before the rotation amount of the bit movement motor 50 reaches the predetermined setting value, when determining in step SC6 described above that the increase in the load when the driver bit 2 is moved (moved forward) in the axial direction is equal to greater than the predetermined range, the controller 100 determines whether to stop the rotation of the bit movement motor 50 and the bit rotation motor 40.

The controller 100 determines in step SC12 the material of the fastening target as the second condition for determining whether to stop the rotation of the bit movement motor 50 and the bit rotation motor 40. When the fastening target is a steel sheet, a load when the hole is drilled in the fastening target by the screw 200 in order to fasten the screw 200 is higher than that of wood or gypsum.

In addition, when the screw 200 cannot be pressed against the steel sheet to drill the hole, for example, in the case where the tip of the screw 200 pressed to the steel sheet is crushed, the driver bit 2 cannot move (move forward) in the axial direction. When the driver bit 2 cannot move (move forward) in the axial direction, the rotation amount of the bit movement motor 50 does not reach the defined rotation amount.

In this way, in the case where the load when the driver bit 2 is moved (moved forward) in the axial direction becomes larger by not drilling the hole by the screw 200 in the fastening target, the abnormality in which the screw 200 cannot be fastened to the fastening target may occur.

When such an abnormality occurs, the rotation amount of the bit movement motor 50 may not reach the predetermined setting value. In the control of controlling the position in the axial direction of the driver bit 2 based on the rotation amount of the bit movement motor 50 and stopping the rotation of the bit movement motor 50, when the rotation amount of the bit movement motor 50 does not reach the predetermined setting value, the rotation of the bit movement motor 50 cannot be stopped.

Therefore, in the case where the fastening target is the material that may not be able to fasten the screw 200, the rotation of the bit rotation motor 40 and the bit movement motor 50 may be stopped by the operation of the trigger 9. Therefore, before the rotation amount of the bit movement motor 50 reaches the predetermined setting value, when determining in step SC6 described above that the increase in the load when the driver bit 2 is moved (moved forward) in the axial direction is equal to greater than the predetermined range, the controller 100 determines the material of the fastening target.

The controller 100 may determine the material of the fastening target based on the rotation amount of the bit rotation motor 40 and determines that the material of the fastening target is a predetermined high-load material such as a steel sheet when determining that the rotation amount of the bit rotation motor 40 reaches the abnormality detection rotation amount described above. In addition, the controller 100 may determine the material of the fastening target based on the time from the start of the rotation of the bit movement motor 50 and determines that the material of the fastening target is the predetermined high-load material such as a steel sheet when determining that the time from the start of the rotation of the bit movement motor 50 reaches the abnormality detection defined time described above. Further, the controller 100 may determine the material of the fastening target based on the rotation amount of the bit movement motor 50 and determines that the material of the fastening target is the predetermined high-load material such as a steel sheet when determining that the rotation amount of the bit movement motor 50 does not reach the defined rotation amount described above when it is determined that the time from the start of the rotation of the bit movement motor 50 reaches a predetermined abnormality detection defined time. In addition, the controller 100 may determine the material of the fastening target based on the rotation speed of the bit movement motor 50 and determines that the material of the fastening target is the predetermined high-load material such as a steel sheet when determining that the rotation speed of the bit movement motor 50 does not reach a predetermined defined rotation speed when it is determined that the time from the start of the rotation of the bit movement motor 50 reaches the predetermined abnormality detection defined time.

When determining that the material of the fastening target is a normal-load material, the controller 100 continues a normal fastening operation. When determining in step SC5 described above that the rotation amount of the bit movement motor 50 reaches the predetermined setting value (defined rotation amount), the controller 100 performs an operation of returning the driver bit 2 to the standby position P1 by stopping the bit rotation motor 40 and reversely rotating the bit movement motor 50 in order to end the fastening operation.

When determining that the material of the fastening target is the high-load material, the controller 100 determines in step SC13 whether the trigger 9 is operated and the trigger switch portion 90 becomes the OFF state. When determining that the trigger switch portion 90 becomes the OFF state, at the timing T3 when the trigger switch portion 90 becomes the OFF state shown in FIG. 8B, the controller 100 stops the rotation of the bit rotation motor 40 in step SC7 described above and stops the rotation of the bit movement motor 50 in step SC8. When determining that the material of the fastening target is the high-load material, the controller 100 may increase the abnormality detection defined time as the second condition as compared with the case where the material of the fastening target is the normal-load material. Therefore, in the case where it is determined that the material of the fastening target is the high-load material, when determining that the trigger switch portion 90 becomes the OFF state during the abnormality detection defined time increased as compared with the case where the material of the fastening target is the normal-load material, the controller 100 stops the rotation of the bit rotation motor 40 and the bit movement motor 50.

Therefore, in the fastening tool 1 that controls the position along the axial direction of the driver bit 2 based on the rotation amount of the bit movement motor 50, when the rotation amount of the bit movement motor 50 does not reach the defined rotation amount and it is not possible to detect that the driver bit 2 reaches the forward movement end position due to factors such as the fastening target being the material that may not be able to fasten the screw 200, it is possible to detect the OFF state of the trigger switch portion 90 to stop the rotation of the bit rotation motor 40 and the bit movement motor 50.

Modification of Fastening Tool of the Present Embodiment

The fastening tool 1 may control the bit rotation motor 40 and the bit movement motor 50 by detecting whether the fastening tool 1 floats with respect to the fastening target based on an output of the contact switch portion 84 as the first condition.

As described above, when the contact switch portion 84 becomes the ON state and the trigger switch portion 90 becomes the ON state, the controller 100 rotates the bit rotation motor 40 in the forward direction and rotates the bit movement motor 50 in the forward direction.

When determining that the rotation amount of the bit movement motor 50 rotated in the forward direction reaches the predetermined setting value (defined rotation amount), the controller 100 stops the rotation of the bit movement motor 50 in the forward direction. On the other hand, when determining that the contact switch portion 84 becomes the OFF state from the ON state and the fastening tool 1 floats in a direction away from the fastening target, the driving of rotating the bit rotation motor 40 in the forward direction is continued in a state where the driving of the bit movement motor 50 is stopped.

As a result, the driver bit 2 rotates the screw 200 in the forward direction to further fasten the screw 200 to the fastening target, and thus the fastening tool 1 moves in the direction toward the fastening target. Therefore, the fastening tool 1 moves relative to the contact arm 82, and the contact switch portion 84 is pressed by the contact arm 82, and thus the contact switch portion 84 becomes the ON state. When the contact switch portion 84 becomes the ON state, the controller 100 performs the operation of returning the driver bit 2 to the standby position P1 by stopping the bit rotation motor 40 and reversely rotating the bit movement motor 50 in order to end the fastening operation.

However, when the abnormality in which the screw 200 cannot be fastened to the fastening target occurs, the driver bit 2 idles with respect to the screw 200, and the screw 200 is not further fastened to the fastening target, and thus the contact switch portion 84 does not become the ON state.

Therefore, as the second condition, when determining that the rotation amount of the bit rotation motor 40 reaches the abnormality detection rotation amount, the controller 100 stops the rotation of the bit rotation motor 40.

Accordingly, in the fastening tool 1 that determines that the fastening tool 1 is floated in the direction away from the fastening target based on the output of the contact switch portion 84 and continues the driving of rotating of the bit rotation motor 40 in the forward direction, the rotation of the bit rotation motor 40 can be stopped based on the rotation amount of the bit rotation motor 40 even when the contact switch portion 84 is not in the ON state again.

In addition, as the second condition, when determining that the time from the start of the fastening operation of the screw 200 reaches the abnormality detection defined time, the controller 100 stops the rotation of the bit rotation motor 40.

Accordingly, in the fastening tool 1 that determines that the fastening tool 1 is floated in the direction away from the fastening target based on the output of the contact switch portion 84 and continues the driving of rotating of the bit rotation motor 40 in the forward direction, the rotation of the bit rotation motor 40 can be stopped based on the time from the start of the fastening operation of the screw 200 even when the contact switch portion 84 is not in the ON state again.

What is claimed is:

1. A fastening tool comprising:

a bit holding portion configured to detachably hold a driver bit and rotatable in a circumferential direction of the driver bit held in the bit holding portion and movable in an axial direction of the driver bit held in the bit holding portion;

a first motor configured to rotate the bit holding portion;

a position detector configured to detect a position of the bit holding portion along the axial direction of the driver bit; and a controller configured to drive the first motor to rotate the bit holding portion, wherein the controller is configured to determine, based on the position of the bit holding portion detected by the position detector, whether the bit holding portion moves to a forward movement end position and to stop the rotation of the first motor in a case where the bit holding portion does not reach the forward movement end position and a stop condition of the first motor is satisfied.

2. The fastening tool according to claim 1, wherein the stop condition is that a rotation amount of the first motor reaches a given rotation amount.

3. The fastening tool according to claim 1, wherein the stop condition is that an elapsed time from start of the rotation of the first motor reaches a given time.

4. The fastening tool according to claim 1, further comprising:

an operation switch portion capable of moving between an ON state and an OFF state, wherein the controller is configured to drive the first motor in a case where the operation switch portion is in the ON state and stop the first motor in a case where the operation switch portion is in the OFF state, and continue the drive of the first motor in a case where the operation switch portion is moved to the OFF state before the controller determines that the bit holding portion moves to the forward movement end position.

5. The fastening tool according to claim 4, wherein the controller is configured to stop the rotation of the first motor in a case where the operation switch portion moves to the OFF state before the first motor satisfies the stop condition, after the controller determines that the bit holding portion moves to the forward movement end position.

6. The fastening tool according to claim 1, further comprising:

a second motor configured to move the bit holding portion along the axial direction, wherein the controller is configured to drive the second motor to move the bit holding portion along the axial direction.

7. The fastening tool according to claim 6, wherein the controller is configured to identify a fastening target to which a screw engaged with the driver bit is fastened, based on a rotation amount or a rotation speed of the second motor, and change the stop condition according to the fastening target.

8. The fastening tool according to claim 6, wherein the controller is configured to change the stop condition according to a load applied to the first motor or the second motor via a screw when an operation of fastening the screw to a fastening target is started.

9. The fastening tool according to claim 8, further comprising:

an operation switch portion capable of moving between an ON state and an OFF state, wherein the controller is configured to drive the first motor in a case where the operation switch portion is in the ON state, and stop the first motor in a case where the operation switch portion is in the OFF state, the controller is configured to, before the bit holding portion moves to the forward movement end position, continue the drive of the first motor in a case where the operation switch portion is moved to the OFF state, identify the fastening target to which the screw engaged with the driver bit is fastened, change the stop condition according to the identified fastening target, and the controller is configured to stop the rotation of the first motor in a case where the operation switch portion is moved to the OFF state after the stop condition is changed.

10. A fastening tool comprising:

a bit holding portion configured to detachably hold a driver bit and rotatable in a circumferential direction of the driver bit held in the bit holding portion movable in an axial direction of the driver bit held in the bit holding portion;

a first motor configured to rotate the bit holding portion;

a contact member configured to come into contact with a fastening target to which a screw engaged with the driver bit is fastened;

a contact switch portion capable of moving between an ON state and an OFF state by movement of the contact member in the axial direction;

a position detector configured to detect a position of the bit holding portion along the axial direction; and a controller configured to drive the first motor to rotate the bit holding portion, wherein the controller is configured to control a timing at which driving of the first motor is stopped based on whether the contact switch is in the ON state or the OFF state, determine whether the contact switch portion is in the ON state or the OFF state when the controller determines that the bit holding portion moves to a forward movement end position based on the position of the bit holding portion detected by the position detector, and continue the rotation of the first motor until a stop condition is satisfied in a case where the contact switch portion is in the OFF state.

11. The fastening tool according to claim 10, wherein the stop condition is that a rotation amount of the first motor reaches a given rotation amount.

12. The fastening tool according to claim 10, wherein the stop condition is that an elapsed time from start of the rotation of the first motor reaches a given time.

13. The fastening tool according to claim 10, wherein the controller is configured to stop the first motor when the contact switch portion is moved to the ON state before the first motor reaches the stop condition in a case where the controller determines that the bit holding portion is moved to the forward movement end position and the contact switch portion is in the OFF state.

* * * * *